United States Patent [19]

Moore

[11] Patent Number: 5,764,032
[45] Date of Patent: Jun. 9, 1998

[54] MULTIPLE BATTERY SWITCHOVER CIRCUITS

[75] Inventor: Bruce Dudley Moore, Santa Clara, Calif.

[73] Assignee: Maxim Integrated Products, Inc., Sunnyvale, Calif.

[21] Appl. No.: 810,828

[22] Filed: Mar. 6, 1997

[51] Int. Cl.⁶ .................................................... H02J 7/00
[52] U.S. Cl. ................................................ 320/126; 307/66
[58] Field of Search ............................... 320/5, 6, 15, 56, 320/126; 307/66

[56] References Cited

U.S. PATENT DOCUMENTS

| | | | |
|---|---|---|---|
| 4,754,160 | 6/1988 | Ely | 307/66 X |
| 5,598,041 | 1/1997 | Willis | 307/66 X |

*Primary Examiner*—Peter S. Wong
*Assistant Examiner*—K. Shin
*Attorney, Agent, or Firm*—Blakely, Sokoloff, Taylor & Zafman LLP

[57] ABSTRACT

Multiple battery switchover circuits for selective interconnecting any one of multiple batteries to a load or a charger while maintaining isolation with other batteries of the system. The present invention maintains the required isolation and interconnection capabilities using only three MOSFETs per battery instead of the four required by the prior art. The three MOSFETs for any one battery in the switchover circuit are connected with one current carrying connection in common, with the other current carrying connection of the MOSFETs being coupled to the charger, the load and a respective battery, respectively. Appropriate connection of the MOSFETs assures that as to any possible conduction path through two of the three MOSFETs, one of the MOSFETs has its parasitic diode back biased. Alternate embodiments are disclosed.

11 Claims, 3 Drawing Sheets

MULTIPLE BATTERY SWITCHOVER CIRCUITS

BACKGROUND OF THE INVENTION

1. Field of the Invention

The present invention relates to rechargeable battery powered devices, and more particularly to rechargeable battery powered devices capable of operating from any one of multiple rechargeable batteries.

2. Prior Art

Steering charging current between multiple battery packs and selecting which battery pack powers the load is a common application in portable equipment such as notebook computers. Because the battery packs may have widely-differing output voltages according to their chemistry, number of cells, and state of charge, it is impractical to use single MOSFETs as charge or discharge switches, due to the parasitic body diodes found in modern discrete power MOSFETs. If single MOSFETs were used, the batteries end up being diode-OR'ed together, which is generally unacceptable, as most systems require each battery to be isolated from the others during charging or discharging. Extra reverse-biased discrete diodes in series with a single MOSFET generate excess heat that is undesirable in small portable systems.

Normally, the isolation is provided by placing two MOSFETs back-to-back in order to have one of the body diodes be reverse-biased at all times. This scheme, shown in FIG. 1, ordinarily requires four MOSFETs per battery, two for charging and two for discharging (powering the load). In this way, either battery voltage can be above or below the other without undesired conduction paths through the body diodes. The MOSFETs are controlled by the control signals C1, C2, C3 and C4, a high signal turning the respective pair of the MOSFETs Q1 through Q8 off and a low signal turning the respective pair of the MOSFETs Q1 through Q8 on. In this Figure, with the charger turned off or unplugged and all the (p-channel) MOSFETs off, the load will not be powered regardless of the state of charge of the batteries. With the charger turned off, the load may be powered by battery A by turning on MOSFETs Q5 and Q6 (C3 low), or by battery B by turning on MOSFETs Q7 and Q8 (C4 low), with diode D1 being back biased so as to not provide a load to either battery through the charger. The applicable part of the truth table is as follows:

Partial Truth Table
Logic is for p-channel MOSFETs, low = ON

| C1 | C2 | C3 | C4 | BATTERY A | BATTERY B |
| --- | --- | --- | --- | --- | --- |
| high | low | high | high | connected to charger | disconnected |
| high | high | low | high | connected to load | disconnected |
| low | high | high | high | disconnected | connected to charger |
| high | high | high | low | disconnected | connected to load |

The above can be extended to more than two batteries, but requires four power MOSFETs per battery to achieve the desired battery isolation under all circumstances.

BRIEF SUMMARY OF THE INVENTION

Multiple battery switchover circuits for selective interconnecting any one of multiple batteries to a load or a charger while maintaining isolation with other batteries of the system. The present invention maintains the required isolation and interconnection capabilities using only three MOSFETs per battery instead of the four required by the prior art. The three MOSFETs for any one battery in the switchover circuit are connected with one current carrying connection in common, with the other current carrying connection of the MOSFETs being coupled to the charger, the load and a respective battery, respectively. Appropriate connection of the MOSFETs assures that as to any possible conduction path through two of the three MOSFETs, one of the MOSFETs has its parasitic diode back biased. Alternate embodiments are disclosed, including embodiments using n-channel MOSFETs and p-channel MOSFETs.

DETAILED DESCRIPTION OF THE INVENTION

Figure 1:
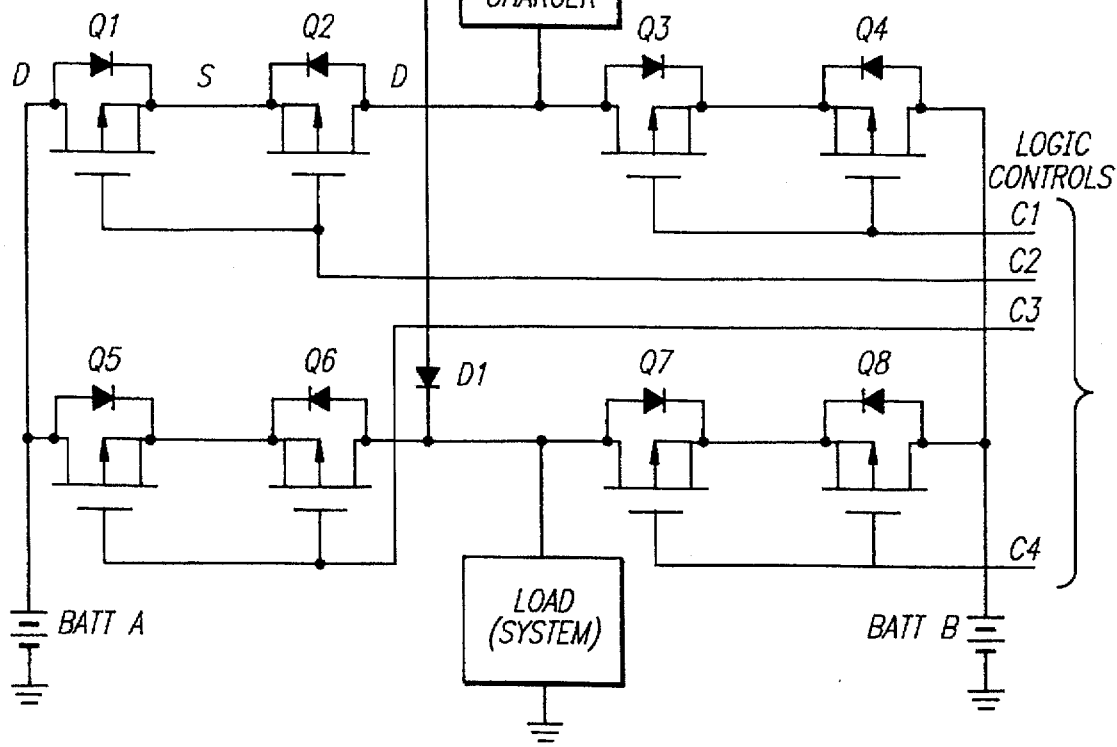
FIG. 1 is a circuit for a prior art multiple battery switchover circuit wherein the isolation is provided by placing two MOSFETs back-to-back in order to have one of the body diodes be reversed-biased at all times.
Figure 2A:
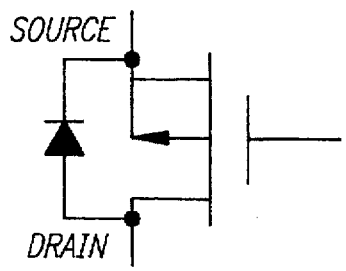
FIG. 2a presents the symbol for p-channel MOSFETs used in the circuits of FIG. 1 and FIG. 4.
Figure 2B:
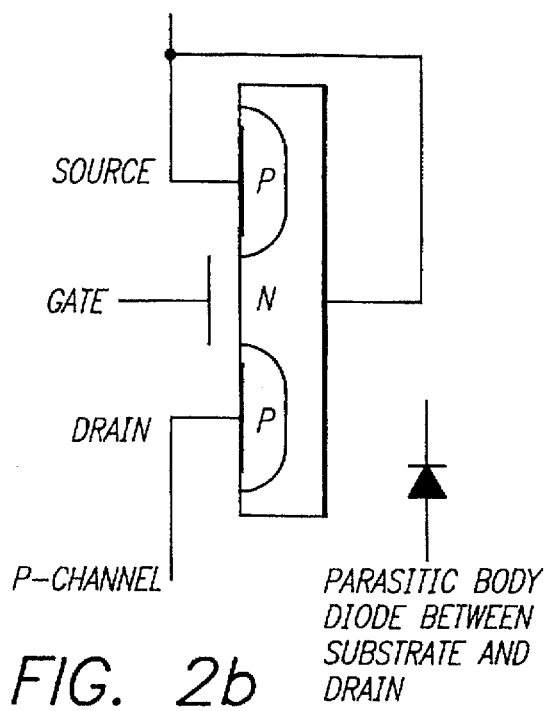
FIG. 2b schematically illustrates the structure of a p-channel MOSFET.
Figure 3A:
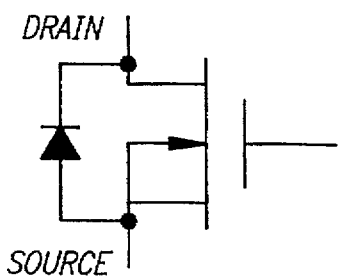
FIG. 3a presents the symbol for n-channel MOSFETs used in the circuit of FIG. 5.

In the description to follow (as well as the previous description of the prior art), the symbol for p-channel MOSFETs of FIG. 2a and for n-channel MOSFETs of FIG. 3a will be used. The actual structure of a p-channel MOSFET may be schematically represented as in FIG. 2b. The device has an n-type substrate, with p-type regions forming the source and drain. The parasitic body diode formed between the substrate and drain has a conduction direction as shown in FIG. 2b. The body diode formed between the source and substrate (not shown) is in series with the parasitic body diode shown and has a conduction direction opposite to that shown in FIG. 2b. Consequently the substrate must be held at the highest voltage, within one pn junction diode voltage drop, or higher than the source (or drain) will be subjected to. While the substrate may be connected to a different supply voltage, forming a four terminal device, commonly the substrate is connected to the source of a p-channel device, forming a three terminal device. This is the connection shown in FIG. 2b, as well as schematically in FIG. 2a and in the circuits of FIGS. 1 and 4.

Figure 3B:
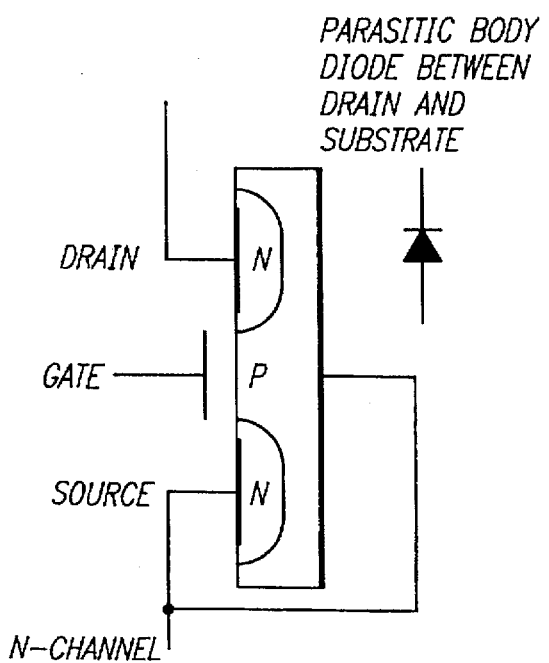
FIG. 3b schematically illustrates the structure of an n-channel MOSFET.

For an n-channel MOSFET, schematically represented as in FIG. 3b, the device has an p-type substrate, with n-type regions forming the source and drain. The parasitic body diode formed between the drain and substrate has a conduction direction as shown in FIG. 3b. The body diode formed between the substrate and source (not shown) is in series with the parasitic body diode shown, and has a conduction direction opposite to that shown in FIG. 2b. Consequently the substrate must be held at the lowest voltage, within one pn junction diode voltage drop, or lower than the source (or drain) will be subjected to. Again while the substrate may be connected to a different supply voltage, forming a four terminal device, commonly the substrate is connected to the source of a n-channel device, forming a three channel device. This is the connection shown in FIG. 3b, as well as schematically in FIG. 3a and in the circuits of FIG. 5.

Figure 4:
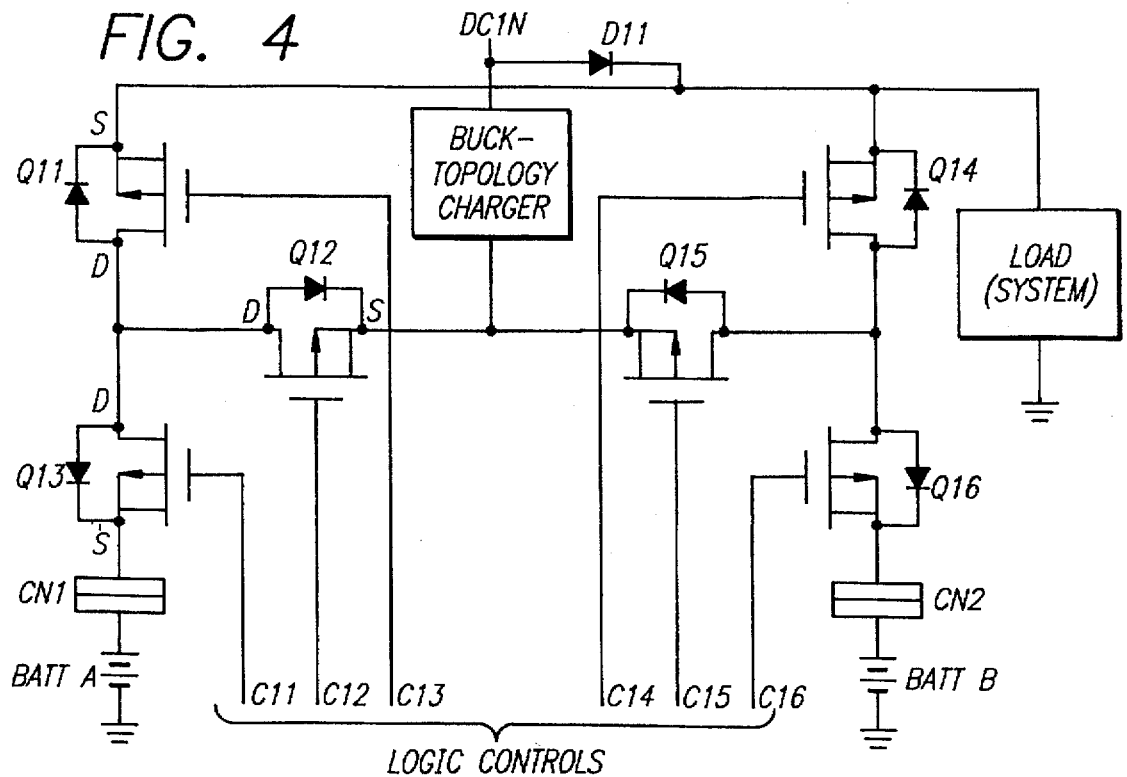
FIG. 4 is a circuit for the multiple battery switchover circuit of the present invention using p-channel MOSFETs such that the required isolation is maintained, but with only three MOSFETs per battery instead of the four required by the prior art.

The multiple battery switchover circuits described herein are a way of interconnecting power MOSFETs such that the required isolation is maintained, but with only three MOSFETs per battery (FIG. 4) instead of the four required by the prior art (FIG. 1). Additional complexity is needed in the control logic, but this complexity is more than offset by the cost savings due to eliminating one MOSFET per battery. This additional logic may readily be incorporated into multiple-battery switch controller ICs, which will provide the logic needed to drive external discrete power MOSFETs in multiple three-MOSFET cells. A two-battery system is shown in FIG. 4, but the invention can easily be extended to include any number of batteries simply by replicating the basic three-MOSFET cell. Normally the load will be powered through diode D1 whenever the power is on, with the charger providing a second source of power. The power supplied to diode D1 is usually taken from the input to the charger, but the same my be from a totally independent power source.

In FIG. 4, two of the respective three MOSFETs are turned on to connect the respective battery to either the charger or the load. For instance, turning on MOSFETs $Q_{12}$ and $Q_{13}$ will cause the charger to charge Battery A and turning on MOSFETs $Q_{15}$ and $Q_{16}$ will cause the charger to charge Battery B. Turning on MOSFETs $Q_{11}$ and $Q_{13}$ will cause Battery A to power the load and turning on MOSFETs $Q_{14}$ and $Q_{16}$ will cause Battery B to power the load. Like diode D1 of FIG. 1, diode D11 of FIG. 4 allows the charger to power the load when on, but to not present any load to the battery operating the load when the charger is off. A partial truth table for the six control signals and the battery connections is given below:

Partial Truth Table
Logic is for p-channel MOSFETs, low = ON

| C11 | C12 | C13 | C14 | C15 | C16 | BATTERY A | BATTERY B |
| --- | --- | --- | --- | --- | --- | --- | --- |
| low | low | high | high | high | high | connected to charger | disconnected |
| low | high | low | high | high | high | connected to load | disconnected |
| high | high | high | high | low | low | disconnected | connected to charger |
| high | high | high | low | high | low | disconnected | connected to load |

It will be noted from FIG. 4 that three MOSFETs are used for each battery rather than four. The three MOSFETs are used as switches, and are arranged with their parasitic body diodes pointing in the same direction relative to the node joining the three MOSFETs. This assures that the parasitic body diodes of any two of the three MOSFETs are conductive in opposite directions so that no current will flow when all three switches are off. Further, because either battery may temporarily have a particularly low terminal voltage when charging begins, the upper MOSFETs in FIG. 4 for coupling each battery to the load ($Q_{11}$ and $Q_{14}$) should have their parasitic body diodes back biased when the charger is driving the load through D11 (anytime the charger is on) and a particularly low battery is being charged. This allows the charger to drive the load at the desired voltage without forward biasing the respective body diode if the respective battery is being charged from a particularly low terminal voltage.

Figure 5:
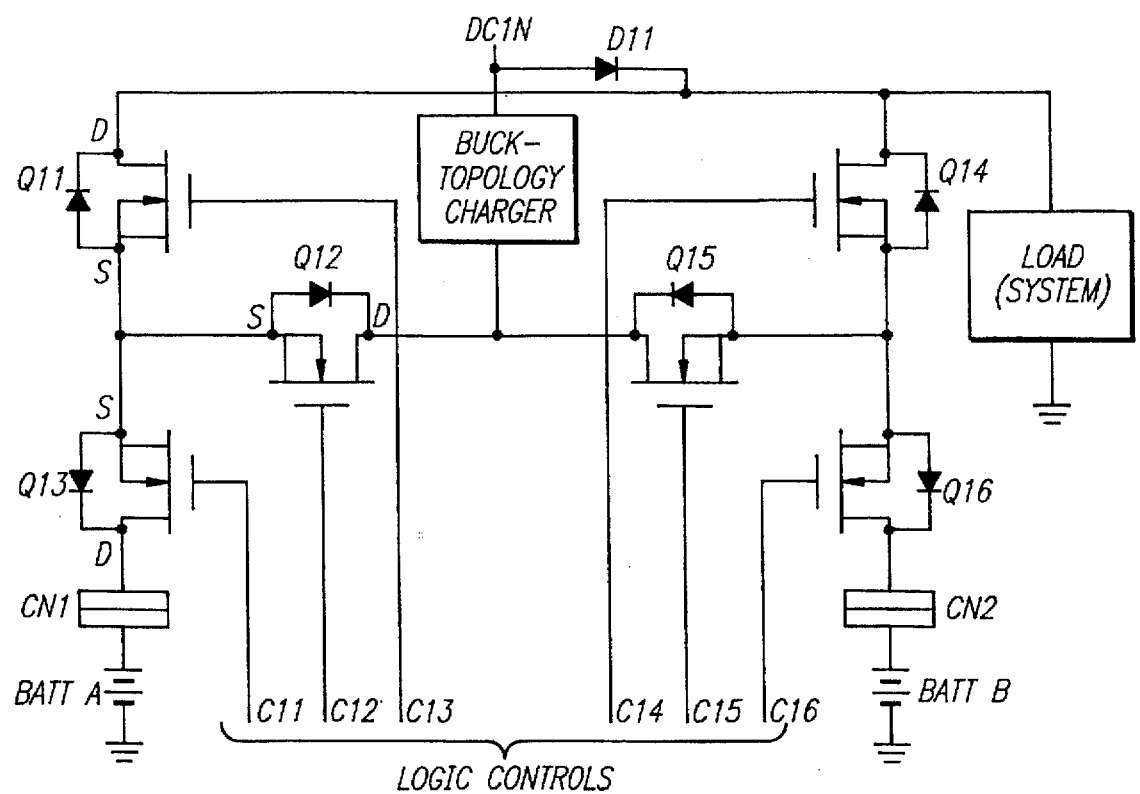
FIG. 5 is a circuit similar to the multiple battery switchover circuit of FIG. 4, but using n-channel MOSFETs to provide the required isolation.

Although p-channel MOSFETs are shown, the battery switchover circuit of the present invention also works with n-channel MOSFETs. Such a circuit is shown in FIG. 5. In the case of an embodiment using n-channel MOSFETs, the control signals C11 through C16 would be the logical inverse of those given in the foregoing table applicable to FIG. 4. Further, embodiments using any mix of n-channel and p-channel devices, while not preferred, may be used provided the parasitic body diodes of the MOSFETs are oriented as shown in FIGS. 4 and 5, namely so as to be nonconductive in a direction toward the common node of the three MOSFETs and conductive in the direction away from the common node.

In the embodiments disclosed, a buck-topology charger has been shown for the typical charger. However the invention is suitable for other types of chargers, such as, by way of example, current-source type adapters that split their output current between battery and load, or any type of current source, voltage limited chargers and voltage source, current limited chargers. Also, it should be noted that the switchover circuits of FIGS. 4 and 5 are for two batteries and two batteries are in fact shown connected to those circuits, the batteries being shown schematically as being readily removable and replaceable by connectors CN1 and CN2, so that the ability of the switchover circuits of the present invention to accommodate multiple batteries does not require that that number of batteries always be present for operation of the circuits. By way of one specific example, a laptop computer may have the multiple battery switchover circuit of the present invention therein to provide for the capability of use with multiple batteries, but be sold with only one battery, the second battery being an extra option or accessory, so that the computer may have as low an advertised price as possible without permanently sacrificing the multiple battery capability.

Thus while the present invention has been disclosed and described with respect to certain preferred embodiments thereof, it will be understood by those skilled in the art that the present invention may be varied without departing from the spirit and scope thereof.

I claim:

1. A multiple battery switchover circuit comprising:
   a first source of power;
   a second source of power;
   a load;
   and in plurality;
      first, second and third field effect transistors, each having a substrate, a control gate, a source electrode and a drain electrode, the substrate of each field effect transistor being electrically coupled to one of the electrodes of the respective field effect transistor, the substrate and the other electrode of each field effect transistor forming a parasitic body diode electrically coupled between the two electrodes of the respective field effect transistor, the parasitic body diode being electrically conductive when a first of the two electrodes is at a higher voltage than a second of the two electrodes and being substantially nonconductive when the first of the two electrodes is at a lower voltage than the second of the two electrodes;

first electrode of the first, second and third field effect transistors being coupled together;

second electrode of the first field effect transistor being coupled to the load and to the first source of power;

second electrode of the second field effect transistor being coupled to the second source of power;

second electrode of the third field effect transistor being adapted for coupling to a respective battery.

2. The multiple battery switchover circuit of claim 1 wherein the field effect transistors are p-channel MOSFETs.

3. The multiple battery switchover circuit of claim 1 wherein the field effect transistors are n-channel MOSFETs.

4. The multiple battery switchover circuit of claim 1 wherein the second source of power is a buck-topology charger.

5. The multiple battery switchover circuit of claim 1 wherein the number of batteries the multiple battery switchover circuit may be coupled to are two.

6. A multiple battery switchover circuit comprising:

a first source of power;

a second source of power;

a load;

and in plurality;

first, second and third p-channel MOSFETs, each having a substrate, a control gate, a source electrode and a drain electrode, the substrate of each field effect transistor being electrically coupled to the source electrode of the respective field effect transistor, the substrate and the drain electrode of each field effect transistor forming a parasitic body diode electrically coupled between the two electrodes of the respective field effect transistor, the parasitic body diode being electrically conductive when the drain electrode is at a higher voltage than the source electrode and being substantially nonconductive when the drain electrode is at a lower voltage than the source electrode;

the drain electrode of the first, second and third field effect transistors being coupled together;

the source electrode of the first field effect transistor being coupled to the load and to the first source of power;

the source electrode of the second field effect transistor being coupled to the second source of power;

the source electrode of the third field effect transistor being adapted for coupling to a battery.

7. The multiple battery switchover circuit of claim 6 wherein the second source of sower is a buck-topology charger.

8. The multiple battery switchover circuit of claim 6 wherein the multiple battery switchover circuit is a two battery switchover circuit.

9. A multiple battery switchover circuit comprising:

a first source of power;

a second source of power;

a load;

and in plurality;

first, second and third n-channel MOSFETs, each having a substrate, a control gate, a source electrode and a drain electrode, the substrate of each field effect transistor being electrically coupled to the drain electrode of the respective field effect transistor, the substrate and the source electrode of each field effect transistor forming a parasitic body diode electrically coupled between the two electrodes of the respective field effect transistor, the parasitic body diode being electrically conductive when the source electrode is at a higher voltage than the drain electrode and being substantially nonconductive when the source electrode is at a lower voltage than the drain electrode;

the source electrode of the first, second and third field effect transistors being coupled together;

the drain electrode of the first field effect transistor being coupled to the load and to the first source of power;

the drain electrode of the second field effect transistor being coupled to the second source of power;

the drain electrode of the third field effect transistor being adapted for coupling to a battery.

10. The multiple battery switchover circuit of claim 9 wherein the second source of power is a buck-topology charger.

11. The multiple battery switchover circuit of claim 9 wherein the multiple battery switchover circuit is a two battery switchover circuit.

* * * * *